United States Patent  
Futoransky et al.

(10) Patent No.: US 7,549,147 B2
(45) Date of Patent: Jun. 16, 2009

(54) SECURITY FRAMEWORK FOR PROTECTING RIGHTS IN COMPUTER SOFTWARE

(75) Inventors: Ariel Futoransky, Buenos Aires (AR); Carlos Emilio Sarraute Yamada, Buenos Aires (AR); Diego Ariel Bendersky, Buenos Aires (AR); Luciano Notarfrancesco, Buenos Aires (AR); Ariel Waissbein, Buenos Aires (AR)

(73) Assignee: Core SDI, Incorporated, Boston, MA (US)

( * ) Notice: Subject to any disclaimer, the term of this patent is extended or adjusted under 35 U.S.C. 154(b) by 570 days.

(21) Appl. No.: 10/414,314

(22) Filed: Apr. 15, 2003

(65) Prior Publication Data

US 2003/0221116 A1 Nov. 27, 2003

Related U.S. Application Data

(60) Provisional application No. 60/372,202, filed on Apr. 15, 2002.

(51) Int. Cl.
*G06F 9/44* (2006.01)
*G06F 9/45* (2006.01)
*G06F 11/30* (2006.01)
*G06F 17/30* (2006.01)
*H04L 9/00* (2006.01)

(52) U.S. Cl. .................. 717/155; 717/131; 380/277; 713/187; 713/189; 726/26

(58) Field of Classification Search .......... 717/140; 713/153, 190
See application file for complete search history.

(56) References Cited

U.S. PATENT DOCUMENTS

| 6,463,538 | B1 | 10/2002 | Elteto ................. 713/190 |
| 6,957,341 | B2 * | 10/2005 | Rice et al. ............. 713/190 |
| 7,051,200 | B1 * | 5/2006 | Manferdelli et al. ....... 713/153 |
| 2001/0037450 | A1 | 11/2001 | Metlitski et al. .......... 713/152 |
| 2003/0093663 | A1 * | 5/2003 | Walker ................ 713/150 |

OTHER PUBLICATIONS

"Enabling Trusted Software Integrity", Kirovski et al., Oct. 2002, pp. 1-13. Online retrived at <research.microsoft.com/en-us/um/people/darkok/papers/spef-asplos.pdf>.*

"Forward-Security in Private-Key Cryptography", Bellare et al., Nov. 2000, pp. 1-24. Online retrieved at <eprint.iacr.org/2001/035.pdf>.*

* cited by examiner

*Primary Examiner*—Tuan Q Dam
*Assistant Examiner*—Thuy Dao
(74) *Attorney, Agent, or Firm*—Peter A. Nieves, Esq.; Sheehan, Phinney, Bass & Green, P.A.

(57) ABSTRACT

A method for protecting software is provided, where source code for the software has a first directive marking an encryption beginning point and a second directive marking an encryption end point. The method contains the steps of: processing the source code to identify a block of code between the first and second directives; compiling the source code to produce a binary file; generating a valid key and a random string; encrypting the random string with the key to obtain a first encrypted value; encrypting a portion of the binary file corresponding to the block of code with the valid key to obtain a second encrypted value; and replacing the portion of the binary file corresponding to the block of code with the second encrypted value and code that can decrypt the second encrypted value during execution of the software.

5 Claims, 6 Drawing Sheets

SECURITY FRAMEWORK FOR PROTECTING RIGHTS IN COMPUTER SOFTWARE

This application claims the benefit of U.S. Provisional Application No. 60/372,202 filed Apr. 15, 2002.

BACKGROUND OF THE INVENTION

1. Field of the Invention

The present invention relates generally to a security framework for protecting rights in computer software. More specifically, the invention relates to protecting computer software using fingerprinting, encryption, cryptographic triggers, license enforcement parameters, and build identification techniques.

2. Related Art

For the last twenty years, the protection of digital data and computer software from unauthorized use and copying has been, and continues to be, an unattained goal for the computer industry. This is a concern, because it is of course in the software developer's interests that each user pays for use of the developer's software.

Computer software is typically delivered in digital form through digital storage devices, such as computer disks or CDs, or through digital-communication channels, such as the Internet. Software, as with all digital content, has the property that it is easy and cheap to obtain multiple pristine digital copies from a single original, e.g., a purchased copy. This has traditionally baffled developers, who are unable to defend against pirates and unlawful competitors and must face losses and lower sales.

As a result of this technical drawback, the software business holds a natural, but atypical, property for a content provider business. Namely, the developer (or reseller) gives or sells the software to a client, while continuing to restrict the rights for using the software even after it is under the sole physical control of the client. For instance, a developer (or reseller) will typically retain copyright to a program so that the client cannot run an unbounded number of copies of this software without permission. A developer could also adjust the pricing for this software according to whether the client is allowed to use it only on his personal computer, or for a given number of times, or if he is just allowed to try it once.

It is in this sense, that the behavior of legitimate users of personal computers can turn adversarial to the interests of the developer or reseller. "Digital rights management" (DRM) is the name given to the subject covering solutions to these problems. It has been increasingly becoming a central requirement for the commerce of digital goods. Moreover, with the growth of software industry—and thus DRM—various types of license rights have emerged.

Generally speaking, a main objective of DRM, as applied to software, is to protect programs from software piracy. Here, software piracy is to be understood as the violation of the lawful rights given to the client by the developer. The main objective of software protection systems is to prevent software piracy by:

a) Obfuscation of the algorithm of a program, i.e., making it computationally infeasible for any user, be it rightful or unlawful, to understand the algorithm underlying the protected code;

b) The possibility of uniquely identifying each build (each generated copy of the software), using an embedded fingerprint system, thereby providing a link to the particular purchaser;

c) The infeasibility for attackers to remove the embedded fingerprint system in order to make the copy un-identifiable by the developer;

d) Implement binding parameters and license enforcement, which would entail a system of checks, implicit or explicit, that guarantee that the program is being used as established by the license policy; and e) Ensure that it is computational infeasibility to have any unauthorized influence on the process of program execution that changes the logic of the program and/or protocol of the program's interaction with the user (this also would entail a system of checks, as mentioned above).

The use of fingerprinting to uniquely identify digital documents is discussed in "Tracing Traitors," by D. Chor, A. Fiat, and M. Naor, Proceedings of Advances in Cryptology, CRYPTO 94, LNCS 839, Springer-Verlag, 1994.

Solutions for license enforcement are rarely capable of implementing fingerprinting functionalities. Reciprocally, fingerprinting systems can seldom be used for software protection. The present invention realizes both, and these software protection functionalities—especially the software non-malleability attained through software protection—will discourage pirates from removing fingerprints. At the same time, the fingerprinting will make software protection easier by providing the capability of tracing pirates.

Conventionally, software protection systems tend to make ad hoc combinations of hardware and software techniques. A typical software protection system is based on the techniques of making certain portions of the executable code unavailable to unlawful users. This is typically done by:

a) Enciphering certain portions of the programs code, and embedding the key needed for decryption (or the complete decryption algorithm) in a piece of protected memory, such as a smart card or hardware dongle (which is a sealed hardware device that stores a decryption key); or b) having the code execute on a secure environment, such as a trusted computer.

Solution (a) suffers from the fact that, there is not such a thing as protected memory. Both smart cards and hardware dongles can be tampered with and the secret data retrieved. These attacks, which are referred to as "timing attacks", and which have been done on implementations of Diffie-Heilman, Rivest-Shamir-Adleman (RSA), Digital Signal Standard (DSS) and other encryption systems, render the underlying solutions insecure. Solution (b) is likewise flawed, because users do not want to rely on connectivity to a network or remote machine for working. Moreover, unless huge portions of the software run on the secure machine, a pirate could "record" these portions and stop relying on the secure machine. But if huge portions of the software are missing (i.e., are located on the secure machine), then the software might as well run completely on the secure machine, which renders this protection scheme highly inefficient.

For example, U.S. Pat. No. 4,757,534 (Matyas) discusses a method for protecting software distributed by disk to clients. A unique encryption algorithm and key is used for each copy of the program. To run the program on a computer, a user must be in possession of a designated smart card in which there is stored the appropriate decryption key. This solution suffers from the problems of excessive cost, overly complex circuitry and user inconvenience. Moreover, no fingerprinting is used, and thus, the owner of a pirated copy cannot be detected.

With respect to convenience, users generally do not want to bother with the task of attaching and detaching a variety of dongles to their computers as they switch from one software package to another. Dongles can consume unacceptably large areas of a desktop as more and more protected software packages are acquired from different vendors. With respect to computer performance, it is undesirable to have a software protection scheme that substantially slows the instruction execution speed of a CPU. There should be a way to protect the rights of legitimate software originators and distributors (copyright licensors and licensees) without inconveniencing end users. The cost of the protection means should be minimal to end users and degradation to CPU execution speed should also be minimal.

As a further example, in U.S. Pat. No. 5,056,140 (Kimbell), a software-only protection system is established for running licensed software on terminals within a network that are linked to a master computer. Software is executed on the terminal computers, but needs to pass through a challenge-and-response mechanism to start running. The security of this system relies on a cryptographically secure mechanism that defeats eavesdroppers. However, this system is defeatable in many ways, e.g., an attacker compromising the master computer would obtain total permissions to copy (and re-sell) the licensed software.

Connectivity between the terminals and the master computer is needed in this example. This is a drawback, since a secure implementation of this system (as a means for licensing software) should have the master computer located outside the internal (e.g., corporate) network, e.g., a computer owned by the software vendor and running in his headquarters. And this in turn can become awkward for users, for example, because they want to use it on their laptops, they use their telephone lines for connectivity, it consumes bandwidth, or because outsiders could monitor the communications with the master computer—though encrypted—to determine what software they use and when they use it. Otherwise, if the master computer were inside the home or corporate office of the licensee, any user of this internal network would be able to obtain full permissions to use and copy-for-use the protected application. Moreover, no fingerprinting is used in this solution.

In U.S. Pat. No. 5,123,045 (Ostrovsky et al.), a data processing system is used that provides protection of software from adversarial observers for a generic random-access machine (RAM) model of computation. No polynomial-time malicious pirate can learn any additional information about the compiled programs except their I/O behavior (even if the pirate experiments with the compiled programs and changes the contents of the memory as he pleases). This conclusion assumes that it is infeasible to open the physically protected chip without destroying the contents of its registers and that it is infeasible to invert a one-way function. The requirement for a physically protected chip is costly and burdensome, and it is unlikely that such a chip exists. Moreover, security mechanisms relying on this type of scheme tend to be insecure, as they are vulnerable to timing attacks. In addition, as mentioned above, users generally do not want to use additional hardware devices. Finally, no fingerprinting is provided by this solution.

In U.S. Pat. No. 5,375,206, the computer system where clients run licensed programs connects to a license server that monitors the usage of these programs, thereby permitting licensed users to run them and forcing users to follow the license policy. Each time a user attempts to use the software, the licensing software sends a network message to the license server requesting a "license token." If a token is available, it is returned through the network to the computer running this software, and the software then performs its function for the user. When the user finishes using the software, the token is returned to the license server. When the server is out of licenses, the said software does not run.

This solution suffers from the fact that any unlawful user can impersonate the servers and thus run purloined software, or even break the license policy by running the software more than the permitted number of times. For example, a pirate could make a single, legal use of the software, keep the tokens used during this first execution, and when finished "rewind" the software to its initial state and re-use the tokens he first saved. This is often known as a "replay attack" in the security literature.

In U.S. Pat. No. 5,903,647, a computer-based, self-launching system associated with a software program or other digital information is provided for distributing the software program or other digital information to a potential purchaser. The self-launching system is attached to a software program or other digital information and includes the ability to launch itself when a user selects the software program or other digital information. Upon launching itself, the system unlocks the software program or other digital information in response to a purchase request. No fingerprinting is used in this system. Furthermore, once a user has purchased a protected program, he obtains an unprotected copy of this program that he may copy or redistribute at will. Also, different protected copies will be typically locked with the same key. This is a drawback, since once a purchaser posts his key on the internet, everyone that obtains a protected copy may unlock it with this key.

In U.S. Pat. No. 6,330,670 (England et al.), a digital rights management operating system protects rights-managed data, such as downloaded content, from access by untrusted programs while the data is loaded into memory or on a page file as a result of the execution of a trusted application that accesses the memory. To protect the rights-managed data resident in memory, the digital rights management operating system refuses to load an untrusted program into memory while the trusted application is executing or removes the data from memory before loading the untrusted program. If the untrusted program executes at the operating system level, such as a debugger, the digital rights management operating system renounces a trusted identity created for it by the computer processor when the computer was booted. To protect the rights-managed data on the page file, the digital rights management operating system prohibits raw access to the page file, or erases the data from the page file before allowing such access. Alternatively, the digital rights management operating system can encrypt the rights-managed data prior to writing it to the page file. The digital rights management operating system also limits the functions the user can perform on the rights-managed data and the trusted application, and can provide a trusted clock used in place of the standard computer clock.

This approach relates to an operating system that enforces DRM capabilities, and it requires the end-user to replace his operating system with the proprietary DRM operating system prior to accessing the protected application. Its effectiveness is based on the assumption that the operating system software running on the end-user workstation has not been tampered with, i.e., that the end-user workstation operating system is not a hostile environment for the protection mechanism.

In general, one of the weakest points in today's software is that protection or restrictions checks are made only once or at least a few times during programs execution. This lead crackers to patch the software very easily. Moreover, there are explicit warnings of such protection/restrictions in the applications which make it even easier for the cracker to look for specific code. The most common approach is to show a warning message and the close the application, so the attacker only has to bypass such function check and the application continues running.

Imposing code constrains allows the developer to tighten the whole application to work properly only if certain license conditions match. For example, if an application license establishes an expiration date, there typically are verification functions that check whether the present date and time are lower than the expiration date. If so, the application continues to run smoothly. When the expiration date has passed, the check fails, and the application is blocked from use (and the user receives an "expiration" note on the computer monitor display). From a cracker's standpoint, locating such functions and modifying their behavior would be enough to defeat a protection scheme relying only on these checks. By contrast, in the present invention, novel license enforcement methods are used that rely on the binding of the execution of the protected program to the license parameters.

The above-mentioned shortcomings, disadvantages and problems are addressed by the present invention. The present invention circumvents these problems by introducing a new technique, called cryptographic triggers, that enhances the power of the traditional and novel fingerprinting and policy enforcement functionalities. The coupling of the fingerprinting and policy enforcement functionalities together with the trigger capabilities produces, in fact, a cryptographically-secure protection method.

SUMMARY OF THE INVENTION

The present invention provides a security framework employs fingerprinting and encryption marking directives and a traitor-tracing (build identification) procedure. The family of fingerprints produced by this protection framework is predicted to be robust. More precisely, it is predicted that no automated process can erase or alter the fingerprints in such a way that the traitor-tracing scheme will not be able to recognize the family of the particular build. On the other hand, the security of the binding process relies on a great number of license infringement checks, which are hidden by a novel tool. These security properties rely on the fact that only manual circumvention is possible and the manual circumvention of the protection scheme requires as much effort as a complete rewriting of the protected software.

These functionalities are augmented by using "cryptographic triggers", which are cryptographic primitives (see "Foundations of Cryptology" by Oded Goldreich, Cambridge University Press 2001, for a discussion of cryptographic primitives) that are used to enhance the fingerprinting robustness and license policy enforcement, e.g., by making it difficult for attackers to erase or tamper with fingerprints and license parameters. Under this technique, certain parts of the resulting build are encrypted with a symmetric cipher, and the protected program automatically handles key management. In general, the cryptographic triggers are used to implement a challenge-and-response mechanism in which, for each challenge, the response is implicitly derived from the pre-specified parameters. When the response is successful, the trigger automatically reconstructs the key needed to decrypt the given cipher text. This event may be referred to as "triggering." An important characteristic of this system is that it is computationally infeasible to recover the plaintext of the encrypted portion without knowledge of the key.

In one aspect of the present invention, a system, method, and computer code are provided for protecting software. The source code for the software has directives marking portions of the source code to be modified. The source code is modified using a random factor based on the directives. The source code is compiled to produce a binary file. Source code starting and ending lines and binary file positions of each of the blocks to be encrypted are stored. Portions of the binary file that correspond to each of these are encrypted. Each of these blocks is decrypted when a function inside the block is required during execution of the software.

Embodiments of this aspect may include one or more of the following features. One of the directives may mark a block of lines to be permuted, and the modification of the source code may include reordering these lines. One of the directives may mark an if-then-else statement. The modification of the source code may include generating a random bit and negating a condition parameter and reversing an order of objects of the if-then-else statement if the random bit is equal to a predetermined bit.

One of the directives may mark a constant declaration statement that has a size parameter and a conditional parameter. The modification of the source code may include replacing a constant value of the constant declaration statement with an arithmetic expression of a size determined by the size parameter and that evaluates to the constant value. The conditional parameter may be evaluated, and a constant may be set to an unpredictable value if the conditional parameter does not evaluate to a predetermined logical value. The conditional parameter may be a logical expression comparing a current time function to a license parameter time value.

In another aspect of the present invention, the source code for the software has a first directive marking an encryption beginning point and a second directive marking an encryption end point. The source code is processed to identify a block of code between the first and second directives. The source code is compiled to produce a binary file. A portion of the binary file corresponding to the block of code is encrypted.

Embodiments of this aspect may include one or more of the following features. Line number information for the block may be stored, and the encryption of the portion of the binary file is based on the stored line number information. Decryption of the encrypted portion of the binary file during execution of the binary file may be based on a secret key obtained during execution of the binary file.

A trigger value may be accepted, and a random string may be encrypted using the trigger value as a key to obtain a first encrypted value. The first encrypted value may be compared to a second encrypted value obtained by encrypting the random string with the secret key. The secret key may be output if the first encrypted value equals the second encrypted value.

A trigger value may be accepted, and a hash of the trigger value may be generated and compared to a hash of the secret key. The secret key may be output if the hash of the trigger value equals the hash of the secret key.

A trigger value may be accepted, and a random string may be encrypted using a pre-determined subset of the trigger value as a key to obtain a first encrypted value. The first encrypted value may be compared to a second encrypted value obtained by encrypting the random string with the secret key. The secret key may be output if the first encrypted value equals the second encrypted value.

A sequence of trigger values may be accepted, and a random string may be encrypted using the sequence of trigger values as keys to obtain a first sequence of encrypted values. The first sequence of encrypted values may be compared to a second sequence of encrypted values obtained by encrypting the random string with a sequence of secret sub-keys. The secret key may be output if each member of the first sequence of encrypted values equals each respective member of the second sequence of encrypted values. The secret key is equal to an exclusive OR of the sequence of secret sub-keys.

In another aspect of the present invention, protected software, for which there is a plurality of different builds, is identified. Each build is divided into sub-strings. The substrings are stored in a table, each sub-string being associated with at least one build identification number. A build to be identified is divided into sub-strings. A lookup operation is performed for each of the sub-strings of the builds to be identified to determine corresponding build identification numbers. The corresponding build identification numbers are analyzed to determine an overall build identification number for the build to be identified.

These and other objects, features and advantages will be apparent from the following description of the preferred embodiments of the present invention.

BRIEF DESCRIPTION OF THE DRAWINGS

The present invention will be more readily understood from a detailed description of the preferred embodiments taken in conjunction with the following figures.

DETAILED DESCRIPTION OF THE PREFERRED EMBODIMENTS

Software programs can be represented in one of many ways. Traditionally, software programs are developed in a source code representation and are delivered to end users in a binary executable representation, which is simply the ready-to-use representation. The binary executable representation, referred to as a "build", may be generated from the source code by a compiler. The present invention allows developers to modify the source code for a program to be protected, in such a way that, when the modified source code is compiled, it produces a protected build. That is, an executable binary file which is fingerprinted and provides license enforcement capabilities.

The source code for a program is first modified by adding marking directives, which are instructions for fingerprinting, license enforcement, or cryptographic triggers. The term "license enforcement," as used herein, is a broad concept that includes any means for forcing users to abide by to policy by making it infeasible to break the selected policy. The term "fingerprinting," as used herein, is a broad concept that includes any means for producing a build that is marked and can be later singled out by these marks. A fingerprint is furthermore called robust, if it is infeasible for any dishonest party to remove the fingerprints so that they cannot be tracked back from the modified copy. The directives do not modify the flow of the program being protected. Only a small, controllable slow down is suffered. The source code is then compiled to generate protected builds.

Different builds are delivered to different clients, and a traitor-tracing (or "recognizer") procedure can be used to identify these different builds, even if they have been modified by the user. For example, suppose that a cracker has taken possession of a authorized build delivered to client ID582 (e.g., because this client gave it to him) and modifies it in order to circumvent the complete protection. Then, the developers will be able to identify the original client (ID582) from the modified copy with the aid of the traitor-tracing procedure.

Figure 1:
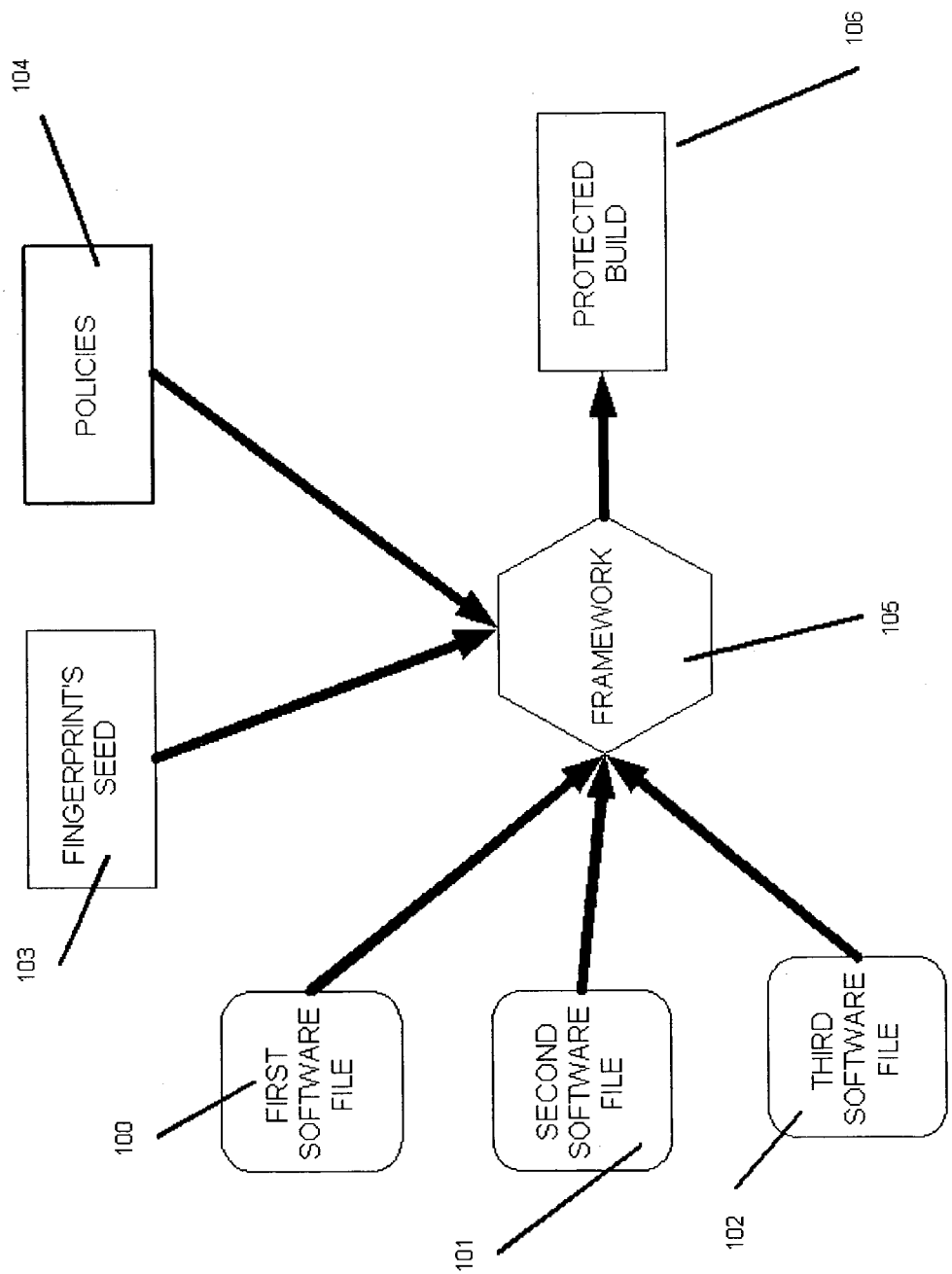
FIG. 1 is a block diagram of the software protection framework.

According to the present invention, as shown in FIG. 1, a software protection scheme is performed over a set of files representing a software program in order to compute a "protected build" of the software program that realizes the original application's functionalities plus is augmented with fingerprinting and license enforcement capabilities.

The software protection is performed over a set of source code files for a computer program, for example: a project consisting of the source code files 100, 101, and 102 that was developed with Microsoft Visual C running on a 32-bit Microsoft Windows™ (win32) platform. Additional input to the protection scheme could include a fingerprint seed (a numeric identifier) 103 and a license policy definition 104, such as an expiration date, e.g., Jan. 1, 2010. The result of the protection process 105 is a protected executable build 106 of the software program that can be identified through the fingerprint seed 103 and that enforces the defined license policy 104.

Figure 2:
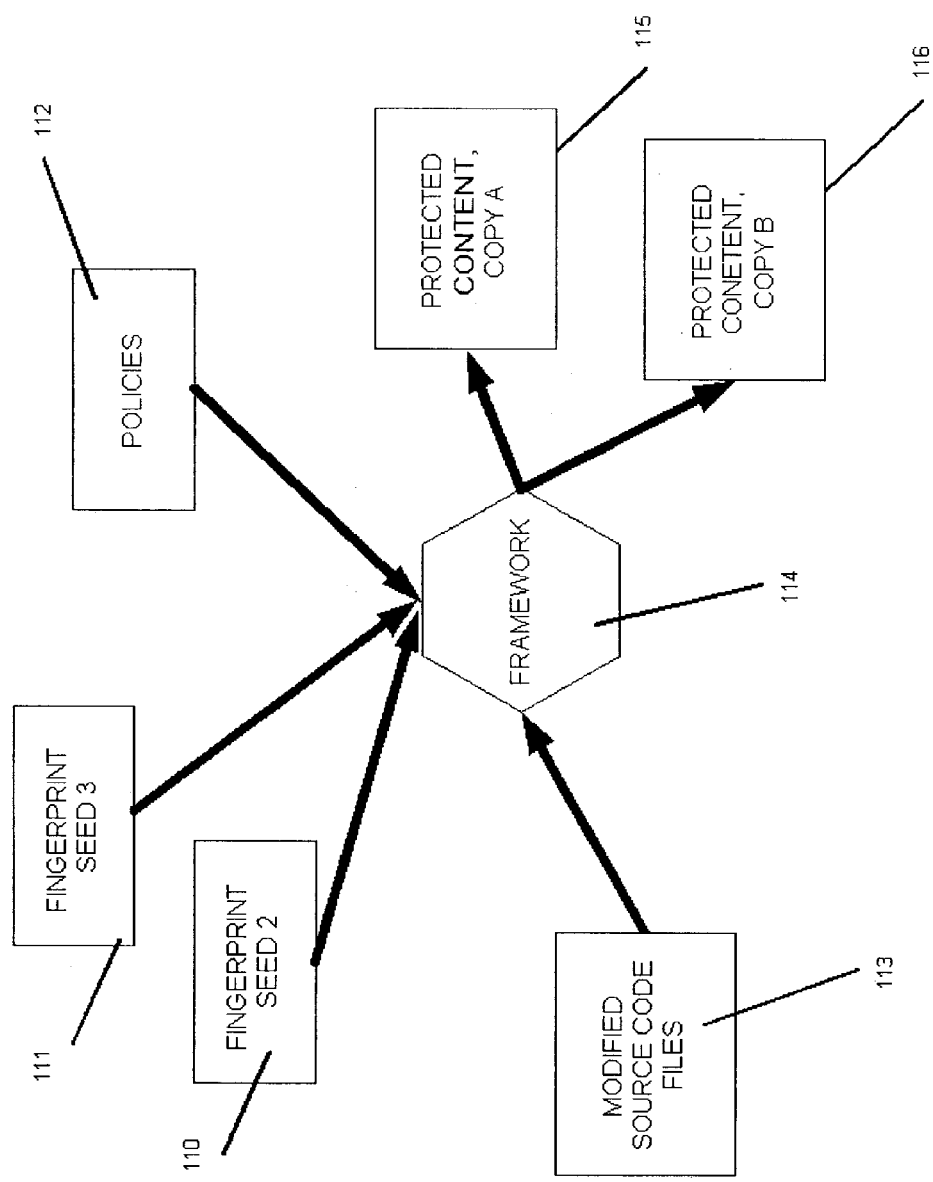
FIG. 2 is a block diagram of the software protection framework showing the generation of multiple builds.

As shown in FIG. 2, the software protection process under this invention, can be applied one or several times, e.g., two times, to transform an unprotected source code for a software program 113 into a number of protected binaries for that program called builds 115 and 116. For each client a different build is delivered. FIG. 2 shows what the process looks like for compiling two builds for two different clients. These files having different fingerprints, i.e., identifiers, for example files 110 and 111, and they enforce the license policies 112.

Figure 3:
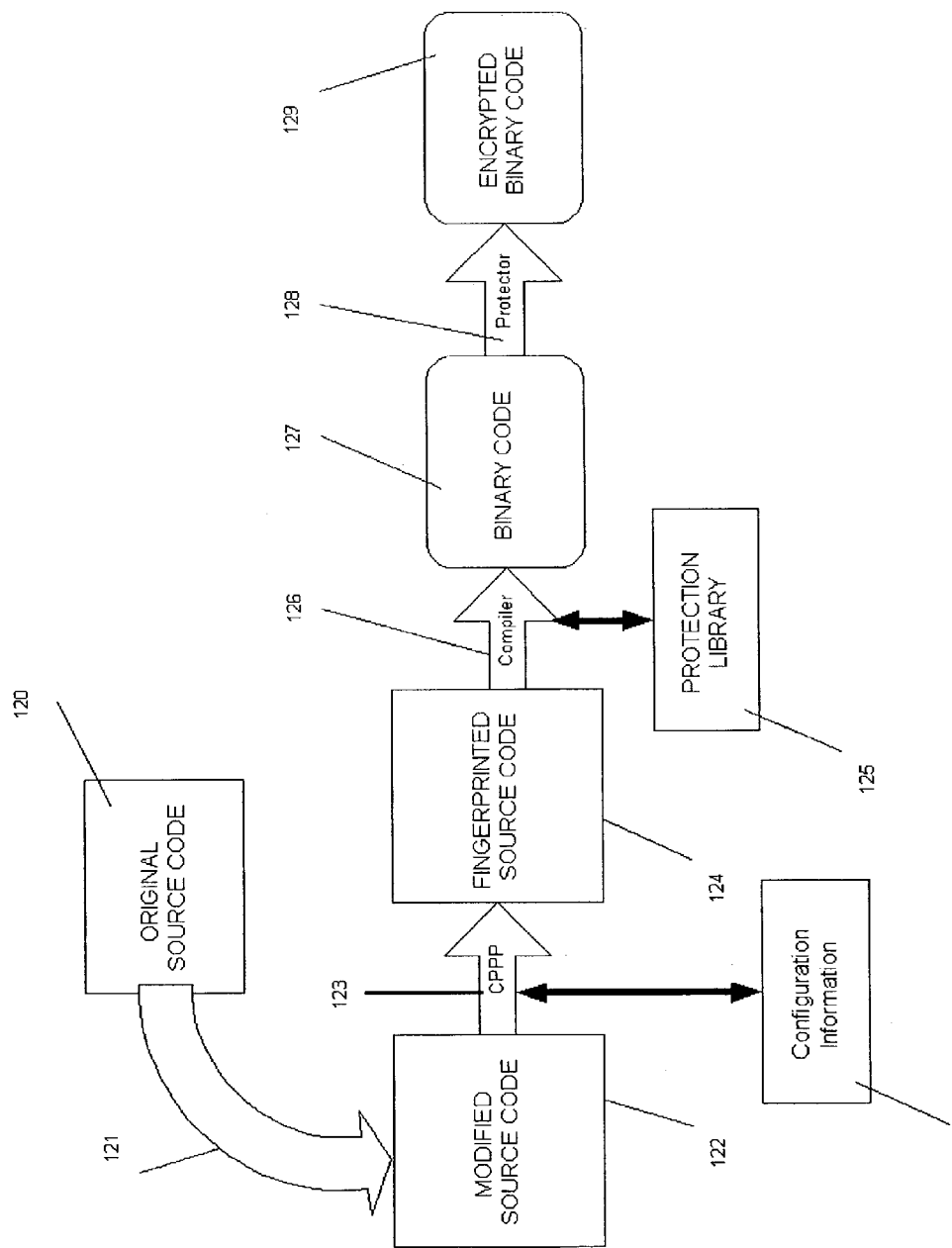
FIG. 3 is a block diagram of the software protection process.

FIG. 3 shows the four stages of the software protection process. Of these four stages, there is an initial stage 121, which is a manual procedure carried out by the software developer that needs to be executed for the first build only. It is during this first procedure that the fingerprint locations are decided and the license enforcement directives are chosen. The remaining three stages of the software protection process are essentially automatic, although they need some configuration information.

Generating additional builds requires carrying out only the last three stages of the software protection process. These last three stages are: the pre-processing stage implemented by the computer program pre-processor (CPPP) 123, the compilation stage implemented by the Compiler 126, and the post-processing stage implemented by the Protector 128.

In this example, during the initial stage 121, the developer decides what parts of the source code will be fingerprinted in each build. This selection is done by adding fingerprinting instructions called "pragma directives", e.g.: fingerprint_if, fingerprint_permute, and fingerprint_constant. These directives will produce—depending on the random seed, the source directory, and the destination directory—different builds for the same (modified) source code.

The fingerprint_if directive works as follows. If there is an if-then-else statement in the program source code, the developer may prepend the fingerprint_if directive, for example as follows:

pragma fingerprint_if
If(a<21){fprint("yes")} else {print "no"};

When executing the software protection process over this source code, according to the value of a bit in a random pool, the if-then-else statement will be compiled as in equation (1) or (2):

$$If(a<21)\{fprint("yes")\} \text{ else } \{fprint("no"\}; \qquad (1)$$

$$If(!a<21)\{fprint("no")\} \text{ else } \{fprint("yes")\}; \qquad (2)$$

That is, if the value of the bit in the random pool is "1" the program line stays as it is in the original source code, as in equation (1), which expresses the logical instruction: if a is less than 21, then print. If its value is "0", the program line is changed, as in equation (2). The random pool may be, for example, a sufficiently large bit-string that is generated from a seed by a pseudo-random number generator. Because equation (2) has been negated twice (to express the logical instruction: if a is not less than 21, then do not print), there is no effect on the logic of the program, yet there will be a detectable difference in the corresponding compiled binary code, i.e., the build.

The fingerprint_constant directive may be prepended to constant declarations in the source code. For example, the declaration of the constant INDEX with a value of 10 may be handled as follows:

pragma fingerprint_constant(23)
define INDEX 10

This will cause the software protection process to randomly generate an arithmetic expression evaluating to 10 of size 23 (the size of the expression indicating the number of literals in the arithmetic expression, including numbers, arithmetic operations and parenthesis) before compilation, for example:

define INDEX 2+5−9+(8*3)−5+0−(4*6)+17

Again, because the expression evaluates to the number 10, there is no effect on the program logic. However, there will be a detectable difference in the build.

Additionally, the fingerprint_constant directive allows the following license enforcement capability. According to this example, the application to be protected expires on Jan. 1, 2010. The developer, instead of using the directive discussed above, inserts the following directive:

pragma fingerprint_constant(23, myTimeFunction (NULL)<1296000000)
define INDEX 10

This will generate an expression evaluating to the declared constant, 10, of size 23, only if the condition myTimeFunction(NULL)<1296000000 holds. Here, myTimeFunction (NULL) is an inline function for obtaining the current time, and 1296000000 is the expiration date (the number of elapsed seconds between Jan. 1, 1970 and Jan. 1, 2010).

In general, the syntax for this pragma directive is:

pragma fingerprint_constant(sizeOfExpression [, condition])
define CONSTANTNAME constantValue where constantValue is the value for CONSTANTNAME, the constant being declared, sizeOfExpression is the size of the expression (e.g., the number of literals in the arithmetic expression including numbers, arithmetic operations and parenthesis), and condition is an arithmetic equation, inequality, or a Boolean equation. Valid expressions are the comparison of variables or functions using "<", ">" or "=" operator with specific constants. Constants may be decimal, octal, hexadecimal or configuration defined date constants, i.e., as defined in the configuration file for the CPPP (date0, date1, ..., date9, etc.).

License compliance is easily enforced through this directive. When the value of condition is false, the expression will evaluate to an unpredicted value (different from its intended value), causing the execution of the program to continue in an unpredictable way. As a result, the program could crash, or continue running producing anomalous results. When several instances of this directive fail to evaluate properly, the protected program becomes degraded in such a way that it is no longer usable (e.g., because it crashes).

The third type of pragma directive, the fingerprint_permute directive, is used as follows. The permutation directives let the pre-processor randomly alter and permute data and control structures in a way that does not affect the code's original logic. These changes impact the built binaries in a way that makes it easily distinguishable from other builds. The permute clause could be used to alter local variable definitions, global variable definitions, function definitions, struct members, class data members, class methods, enumerated types, and constant arrays and statements. For example:

```
Class myClass
{
public:
    #pragma fingerprint_begin_permute
        int var1;
        int var2;
        int var3;
        myClass( );
        ~myClass( );
        void doSomething1( );
        void doSomething2( );
    #pragma fingerprint_end_permute
}
```

Statements should only be permuted if functionality can be assured, i.e., the particular order of the statements being permuted is not important to the logical flow of the program. The general syntax is given by:

pragma fingerprint_begin_permute [(Permutation ID)]
<item>
...
<item>
pragma fingerprint_end_permute The permutation ID is an optional numeric identifier, which when used causes the protection process to apply the same permutation to every permute clause with the same id. Notice that the permutation id option should only be used when permuting the same number of lines (no matter their nature).

Encryption pragma directives are used to enhance license enforcement and fingerprinting capabilities. The main idea behind cryptographic triggers for software protection is to give developers the ability to select certain parts of the source code that will be enciphered when they are compiled to binary form. Thus, the build will consist of an executable program of which some parts are enciphered.

The enciphered parts of code will be deciphered as required during normal execution of the program. This is to be contrasted with an abnormal usage, such as partial execution by a cracker using debugging tools to circumvent the protection scheme. For example, suppose there is a functionality in the protected application that executes only after two other parent applications have been executed—call the latter the child functionality. Suppose further that the cracker loads the protected application into the debugging tool in order to execute the child isolated functionality without executing the parent applications. In such a case, the child functionality would still be enciphered and could not be executed, whereas, if it were not for the cryptographic triggers, the cracker might be able to execute the functionality. Thus, crackers examining protected binaries, e.g., with debugging tools, will be unable to the functionality of the code they are analyzing.

The encryption pragma directive may be implemented as follows for a particular piece of code selected for encryption:

pragma encrypt (<block id>)
<Code functions or fragment >
pragma end_encrypt

Here, the <block id> parameter is used to identify the block in references from trigger clauses, which are explained below. The encryption pragma directives are used to define the range of the encrypted block. The software protection framework will encrypt the code fragment using a randomly generated key, and implement the necessary key management involved to retrieve it using the available triggers. This is done during the software protection process, as discussed below. Encryption blocks may be nested or disjoint, but must not be overlapped. Before calling a function within an encrypted block, the block must be decrypted. The encryption range defined should not include global variables or constants.

Trigger schemes may be used with the encryption techniques described above to create more robust protection. The combination of encryption and triggering makes almost all debugging methods impossible, and it not only provides obfuscation, but also inhibits crackers from modifying (let alone deleting) the embedded protection mechanisms.

A simple trigger may be implemented that triggers when a pre-determined message is presented. This mechanism stores the encryption Enc(K,S) of a secret S with a key K, say a bit-string describing this secret, and decrypts the secret only when the mechanism receives as input a message matching this key (otherwise it returns no answer). Furthermore, the check is done in an implicit way that does not leak the key when no match is found. When the input does equal the key, we say that the triggering criterion is met.

The following is an example of an implementation of the simple trigger. The algorithm first needs to be initialized. Initialization should occur in a secure form, meaning that no attacker should be able to monitor initialization, and the initialization parameters should be kept secret. To make the initialization, first a symmetric cipher needs to be selected, such as a Rijndael cipher, then a key K and a random string iv of the minimum block size are generated for this cipher. The cipher is then used to encipher both the string iv and the secret S with the key K. These results are referred to as Enc(K,iv) and Enc(K,S), respectively. Then, the secret S and the key K are deleted. The initialization information is the values iv, Enc(K,iv) and Enc(K,S).

The simple trigger algorithm works as follows: whenever it receives an input X, it enciphers the string iv using X as a key and checks whether this agrees with the enciphering of iv with K, e.g., if Enc(K,iv)=Enc(X,iv) holds. If they do agree, it must be that X and K are equal. Then, the deciphering algorithm is used to decipher the Enc(K,S) with the key X (equal to K). If they do not agree, nothing is done. This scheme is secure under standard cryptographic assumptions.

As described above, the simple trigger is hit when the information received as input to an initialized trigger equals the key. The check is done in an implicit way, such that the value of the key is not leaked by the algorithm. That is, an attacker examining an initialized simple trigger has no way to extract any information regarding the key or the secret.

Two other triggering schemes may be used:

(1) In a subset trigger scheme, only some bits of the inputted bit-string are relevant. For example, triggering occurs only when certain fields of a network packet (used as input) agree with some pre-determined values; and (2) In multiple-message scheme, the trigger awaits several simultaneous matches before triggering. For example, two binary keys need to be inputted in order for this trigger to output the identification number of a bank account. The secure-triggering concepts discussed above encompass a great variety of applications, under different security requirements and efficiency constraints.

One characteristic of these cryptographic trigger applications is that there are functionalities that need to be hidden until needed for use, such as the uncovering of a secret in the previous example. The means to produce the un-hiding of these functionalities and subsequent activation are cryptographic triggers. In each case the trigger procedure is constructed by a trusted party, and deployed on one or more machines. The machines where the triggers reside may be controlled by malicious users. However, the use of cryptographic trigger schemes makes it infeasible for attackers to hit the trigger (e.g., unveil the secret piece of code) other than by brute-force attacks on the triggering information.

The different cryptographic triggers are given by the different check mechanisms. These mechanisms verify whether the different triggering criteria are verified. We introduce here algorithms solving problems defined by the subset and multiple-message trigger schemes.

The subset trigger scheme is hit only when a specific subset of bits of the input message is set to prefixed values, ignoring the values of bits not in the subset. For example, suppose a server receives 128-bit strings, whose bits are indexed from 1 to 128. The subset trigger implementation checks whether the bits indexed, e.g., as 1, 2, 3, 5, 7, 11, 13, 17, 19 and 23 of any incoming packet conforms with a certain bit sequence, e.g., (0,1,0,0,1,1,0,1,0,0). If so, the triggering criterion is met, and the secret unveiled. Otherwise, the algorithm outputs no response.

As with simple triggers, discussed above, this procedure starts with an initialization step. Call S the secret. Firstly, a pair of integers k and s is chosen, with s greater than k, where k stands for the key size and s stands for the size of the input strings. In the previous example s=128 and k=10. Also, a finite set K of ordered pairs (i,b) is chosen, where i is always an integer equal to or greater than 1 and smaller than or equal to s, and b is either 0 or 1. This set K establishes the triggering information. A bit-string P of size s received as input will satisfy the triggering criterion, if and only if, for every pair (i,b) in K, it holds true that the i-th entry of P equals to b.

Figure 4:
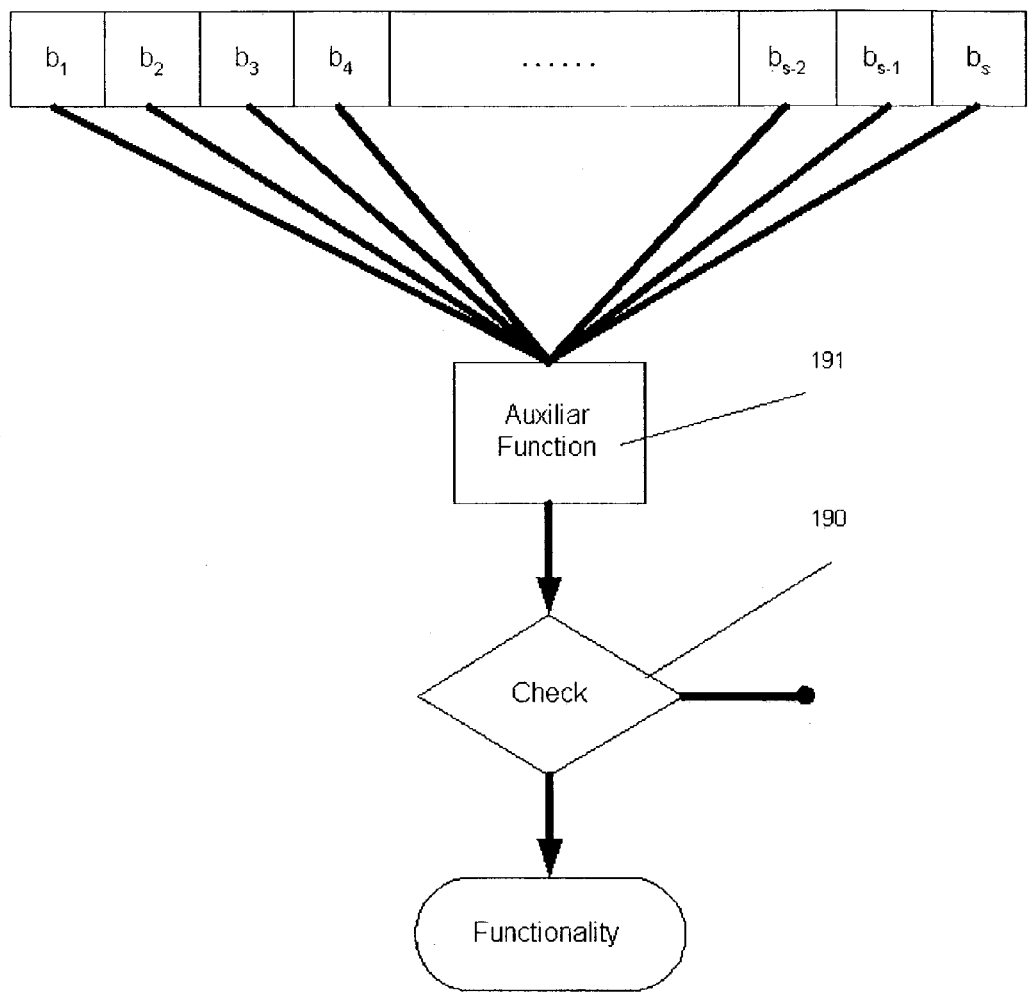
FIG. 4 is a block diagram of a sub-set cryptographic trigger.

As shown in FIG. 4, the check mechanism 190 for this trigger scheme uses a family of auxiliary functions 191 for receiving bit-strings of size s ($b_1, b_2, \ldots b_s$) as input and outputting bit-strings of size k. These functions T can be chosen such that for every string P of size s that satisfies the trigger criterion, as described above, the output T(P), of T with input P, is always the same. Suppose there is given one such function. Call it T, and call B the output B=T(P), i.e., the output of function T when inputted with a bit-string P satisfying the triggering criterion. Additionally, construct a simple trigger whose triggering criterion is satisfied when inputted with the key B. The initialization procedure is then finished.

The subset trigger scheme has as public information a description of the function T and the strings iv, Enc(B,iv), and Enc(B,S). Once it receives a bit-string P of size s, the scheme calculates T(P) and then runs the simple trigger scheme. That is, it checks whether Enc(T(P),iv)=Enc(B,iv), and if it does, it recovers the secret as: Dec(T(P),Enc(B,S)). Otherwise, nothing is done.

Each function of the family of auxiliary functions receives bit-strings of size s as input and outputs bit-strings of size k and satisfies the following properties. For every bit-string P=(P[1],P[2], . . . ,P[s]) of size s there exists a sequence (i1,i2, . . . ik) of integers, each different from each other and between 1 and s (inclusively), such that T(P)=(P[i1], . . . ,P[ik]).

Furthermore, every bit-string Q=(Q[1],Q[2], . . . ,Q[s]) of size s that satisfies P[j]=Q[j] for every j in {i1,i2, . . . ,ik}, has the same output: T(P)=T(Q).

Moreover, one can always choose a function T from this family such that if K is constituted of the pairs (i[1],b[1]),(i[2],b[2]), . . . ,(i[k],b[k]), then T(P)=(b[1],b[2], . . . ,b[k]) for every bit-string P=(P[1], . . . ,P[s]) of size s that verifies P[i[j]]=b[j] for every j=1, . . . ,k. The procedure for constructing this family of functions is described below.

Setup parameters k and s are positive integers, with s smaller than k. To initialize the scheme, a set K of pairs (i,b) is needed of cardinality n, where i is an index between 1 and s, and b is a bit (i.e., b=0 or b=1). No two pairs in K have the same index i. A cryptographic hash function, e.g., SHA160 (as established by the National Institute of Standards and Technology, http://www.nist.gov) is denoted by "Hash" in the equations below. The auxiliary function 191 is defined by a set of bit strings K[1], . . . ,K[s] each of size 160 (the output size of the hash function). First it is shown how are these values are chosen, and then how the auxiliary function is evaluated. To this end, there is an ordering, e.g., by a random reordering, of the pairs in K as (i[1],b[1]) , . . . ,(i[k],b[k]).

The pairs K[i[1]], . . . ,K[i[[k]] are defined recursively as follows:

For each positive integer j smaller than k, suppose that K[i[1]], . . . ,K[i[j]] have been calculated. Denote by t the number of indices i with:

$$i < \text{Hash}(b[i[1]] \ldots b[i[j]]) \text{ XOR } K[j] \text{ modulo } (s-j).$$

The expression "x modulo m" notation is used to denote the remainder of integer division of x divided by m. Remainders are taken between 0 and m−1. Then K[i[[j+1]] is chosen such that:

$$i[j+1] = -t + (\text{Hash}(b[i[1]] \ldots b[i[j]]) \text{ XOR } K[j+1])$$
$$\text{modulo } (s-j).$$

This determines the values of K[m] with m in {i[1], . . . ,i[k]}. The values K[m] with m different from the I[1], . . . ,i[k] are selected following the uniform (random) distribution for the bit strings of a size equal to the output size of the hash function.

The following is a description of the auxiliary procedure. Let P=(P[1], . . . ,P[s]) be an input.

First, set i[1]:=1, and y[1]:=P[1].

We present a subroutine that recursively calculates the bits from the output y=(y[1], y[2], . . . , y[k]). Given a positive integer j, suppose that i[1], i[2], . . . , i[j] have been calculated and that the partial value y[1], y[2], . . . , y[j] of the output value y is also calculated. Then the following procedure outputs an index i[j+1]. Subsequently, y[j+1] is defined as the value of P[j+1]. It is clear that one such procedure calculates the auxiliary function (for starting position i[1]=1).

The recursive aspect of the subroutine works as follows. Given i[1],i[2], . . . ,i[j] and y[1],y[2], . . . ,y[j], the index i[j+1] is defined as:

$$i[j+1] := -t + (\text{Hash}(b[i[1]] \ldots b[i[j]]) \text{ XOR } K[j])$$
$$\text{modulo } (s-j),$$

where t is defined as the number of indices i[e] such that:

$$i[e] < (\text{Hash}(b[i[1]] \ldots b[i[j]]) \text{ XOR } K[j]) \text{ modulo}$$
$$(s-j)$$

and e is smaller than j.

Once this procedure finishes, it outputs a string y of size k. If this string satisfies the triggering criterion, i.e., if Hash(y)=Hash(b[1] . . . b[k]) holds, then y is used as a key to decrypt the secret. Otherwise, the procedure is repeated with i[1]:=2 and y[1]:=P[2].

In the multiple-messages trigger scheme, the triggering criterion is met when an array of pre-selected keys is inputted. Let k and n be integers with n greater than 2, and let S be a secret. The trigger criterion is met if certain number, n, of cryptographic keys of size k are part of the input. Say, let K[1], . . . ,K[n] be n keys of size k (each). And call K the value of the exclusive OR of these keys: K:=K[1]XOR K[2]XOR . . . XOR K[n].

The algorithm is initialized by choosing a random string iv and computing Enc(K[1],iv), . . . , Enc(K[n],iv), Enc(K,iv) and Enc(K,S) and these values become public information.

Figure 5:
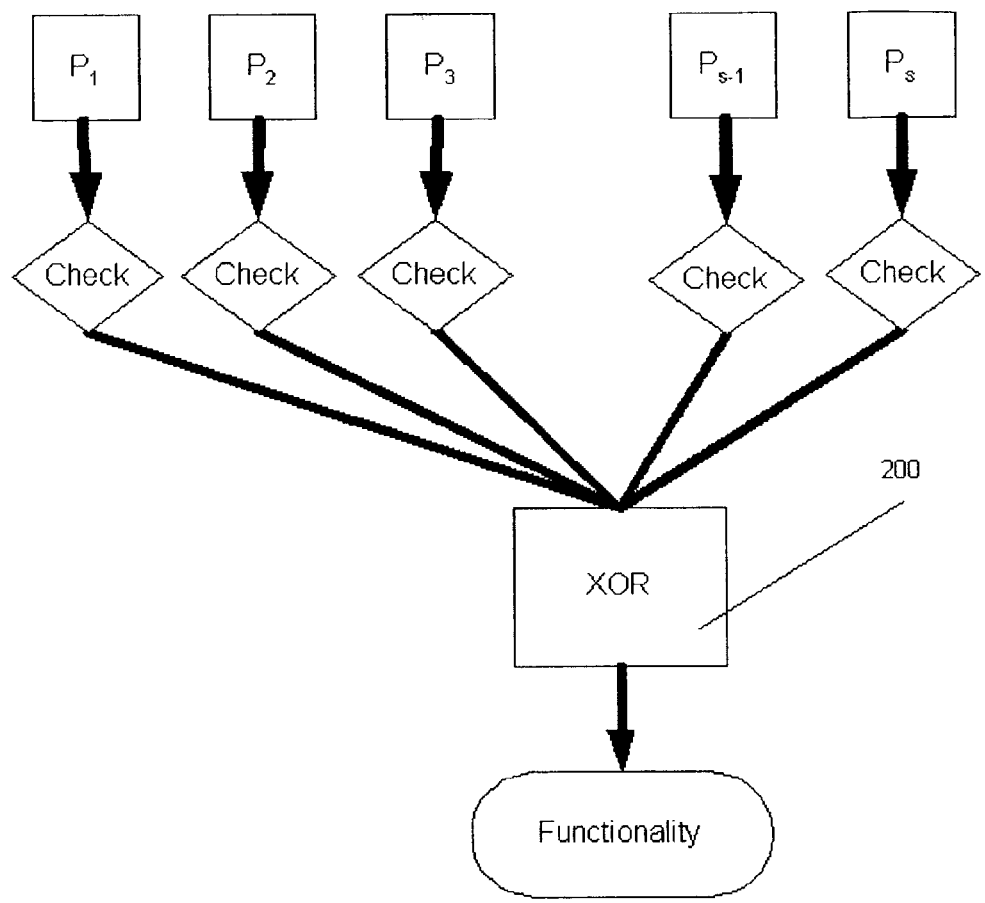
FIG. 5 is a block diagram of a multiple-message cryptographic trigger.

As shown in FIG. 5, suppose that the tuple of bit-strings P[1], . . . ,P[m] is received as input. Here each P[i] is of size k. The algorithm checks whether there exists an increasing sequence of integers i1,i2, . . . , in such that P[i1] matches K[1], P[i2] matches K[2] and so on. This is done in an implicit manner by checking if Enc(P[i1],iv)=Enc(K[1],iv), Enc(P[i2],iv)=Enc(K[2],iv) and so on. If all equalities hold, then K=P[i1]XOR . . . P[in] must hold. If so, the secret is decrypted with the key X=K. Otherwise, nothing is done.

Figure 6:
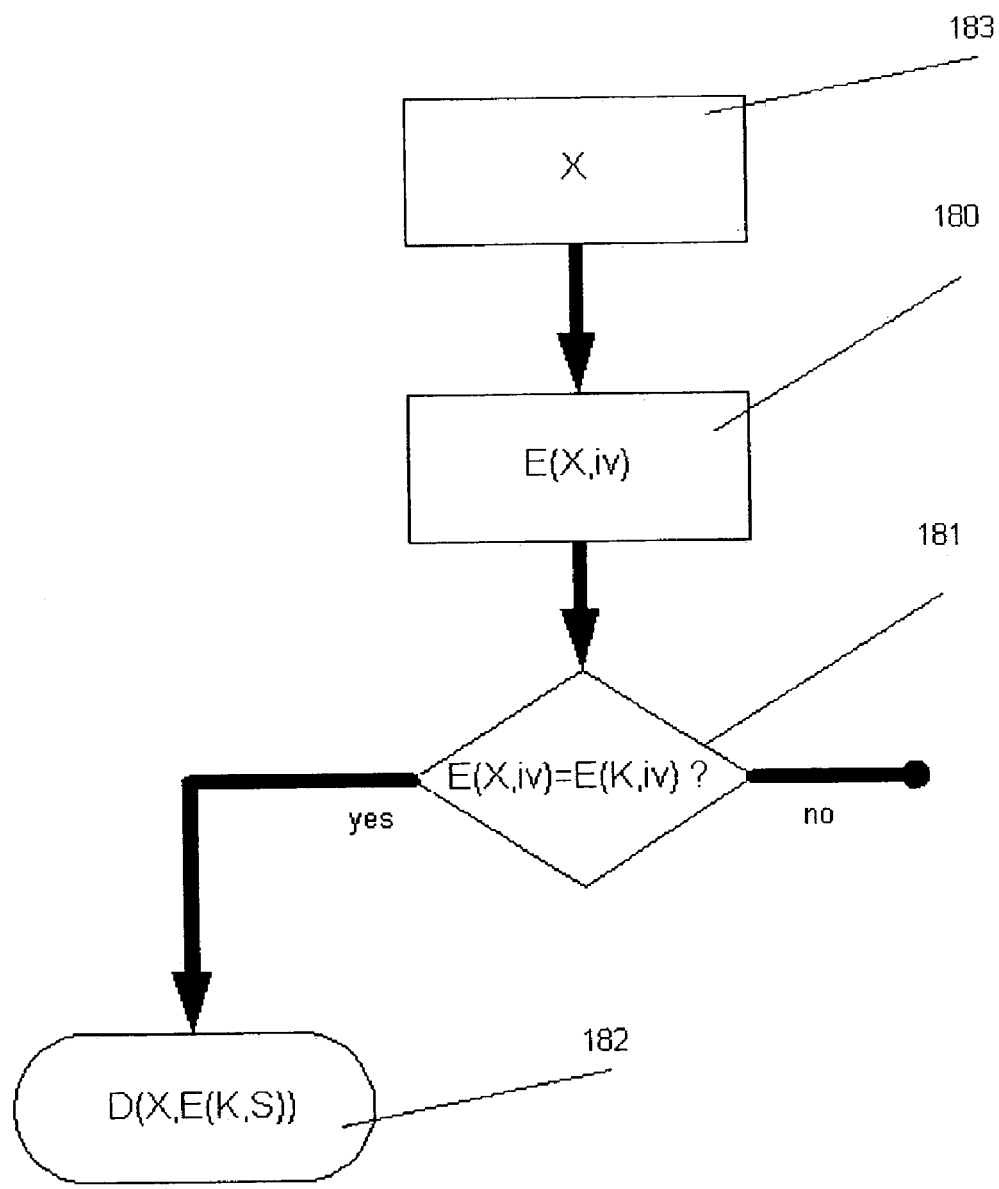
FIG. 6 is a block diagram of the implementation of an encryption directive in conjunction with a cryptographic trigger.

The following is an example of the implementation of an encryption pragma directive is in conjunction with a trigger. In this example, the trigger_strcmp clause is used to implement a string comparison and to obtain decryption keys and ranges. A flow chart for the algorithm is depicted in FIG. 6. The following example shows how this is implemented:

| Line 1. | #pragma trigger_strcmp(ID1) |
| Line 2. | if(!strcmp(argv[1], "A157B D2C39")) |
| Line 3. | { |
| Line 4. | #pragma encrypt(ID1) |
| Line 5. | printf("Etiquette is etiquette. He can't wear gray trousers."); |
| Line 6. | #pragma end_encrypt |
| Line 7. | } |

When processed by the software protection process, the lines of code between the encrypt and end_encrypt directives, namely Line 5, will be encrypted. The label ID1 used in lines 1 and 4 is a block identifier that is used to uniquely identify the block to be encrypted. The value of variable argv[1] in line 2 is assigned elsewhere in the code and in FIG. 6 appears as step 180. The value "A157B D2C39", also in line 2, is a constant. Line 2 establishes an if-then command (181 in FIG. 6) that evaluates to TRUE only if the hash value of the variable argv[1] agrees with the constant "A157B D2C39". When the if-then statement of line 2 evaluates to TRUE, the value of the variable argv[1] will be used as a key to decrypt (182) the encrypted content, i.e., the enciphered code for Line 5.

The above example, which uses the trigger_strcmp directive, illustrates a more complex triggering configuration than the simple trigger described previously. The fundamental difference is in the check mechanism. With the simple trigger, an input P was checked to satisfy the triggering criterion if Enc(X,iv)=Enc(K,iv) from the public values iv and Enc(K, iv). With the example using the trigger_strcmp directive, the check is done by Hash(P)=Hash(K) from the public value Hash(K). Using trigger_strcmp with encrypt/end_encrypt directives helps the developer to better protect the software. To crack this protection, the attacker has to know exactly what kind of information is the "right one" to match the trigger_strcmp function, but trying to revert the hash function is a quite complex and time consuming process.

Once the manual procedure of adding pragma directives throughout the source code is completed, the remaining three stages of software protection process are performed. As discussed above in the discussion of FIG. 3, these three stages are: the pre-processing stage implemented by the computer program pre-processor (CPPP) 123, the compilation stage implemented by the Compiler 126, and the post-processing stage implemented by the Protector 128.

The CPPP module pre-processes the modified source code 122 (to which the pragma directives have been added) in preparation for the subsequent stages of the protection process by making certain syntactical modifications. The CPPP processes, for example, all of the files with the extensions .c and .h in directory c:\scr. The output of this process is a modified, fingerprinted source code, stored in c:\dst, that has all the necessary tags needed for enciphering.

The CPPP application acts in two passes. On the first pass, it parses the source code grammar so that it can be readily read. On the second pass, it modifies these files with a random factor, as seeded by a random seed stored in a configuration file 130 (see FIG. 3), according to the pragma directives for fingerprinting and records the result in a target directory, e.g., c:\dst. This last pass of the CPPP also generates temporary files that will be needed for the compilation stage and final protection stage.

The CPPP is an executable program that can be used through the command line. Its usage is as follows:

cppp [<src_dir>] [<dst_dir>]
[/MAKE[<build name>] [/REBUILD]]
[/TARGETS<n>]
[/ENCRYPTION]
[/NOENCRYPTION]
[/PARALLEL]

When used through command line, the CPPP application has as parameters the source directory <src dir> (c:\scr in this example), which is the directory in which the source code is located, and the destination directory <dst dir> (c:\dst in this example), which is the directory in which the pre-processed source code is stored, i.e., the output of the CPPP.

Optional parameters include the /MAKE[<build_name>] flag that instructs the CPPP module to compile the generated sources using Microsoft Visual C standard compiler: msdev. In this case, CPPP will look for msdev in the system path and in standard installation directories. If a build name is provided, as <build_name>, msdev will be invoked in the specified target. When the optional flag /REBUILD is specified, msdev will clean the target directory before building the project. Optional flag /TARGETS <n> (where n is a positive integer) allows generation of n different distributions that are placed in different directories named <dst dir>0<dst dir>1 . . . <dst dir>n. Optional flag /PARALLEL instructs the pre-processor to simultaneously invoke multiple copies of msdev while building the target distributions.

Another optional flag, /ENCRYPTION, activates the encryption system by installing a call to the postprocessor in every project file of the target directory. This command line option overrides any configuration file directive. Optional flag /NOENCRYPTION turns off encryption support by removing the postprocessor stage from the build project. This command line option overrides any configuration file directive.

Additional input can be added through an input configuration file, softprot.ini, which is located in the same directory as the source code. For example, when using the command line, cppp c:\src c:\dst, the CPPP will look for the configuration file softprot.ini in directory c:\src. The format for the configuration file is as follows:

Dontcopyext=<extension list>
encryption={yes|no }
randseed=<random string>
date1=<date>
date2=<date>
date3=<date>
date4=<date>
date5=<date>
date6=<date>
date7=<date>
date8=<date>
date9=<date>

The line dontcopyext<extension list> specifies which types of files should be excluded from the destination directory, i.e., those that will not be copied into the destination directory, where <extension list> is a semi-colon separated list of file extensions, with default value ".obj; .sbr; ilk; .pch; .exe; .lib; .pdb; .exp; .idb".

The randseed=<random seed> line defines the random seed that is simultaneously used for generating permutations, constant expressions, and the keys used for encryption. When the same random seed, destination directory and source code are used for two different iterations of the CPPP, the exact same changes will be applied to the code producing almost the same build. If a random seed is not specified, the CPPP randomly generates a random seed using a proprietary algorithm seeded with machine variables. This pseudo-random number generator is modular and it can be replaced by any other.

The random pool generator used for the CPPP allows the designated destination directory to be taken into account in performing the random initialization. Thus, when several targets are built at the same time in different destination directories (e.g., the directories <dst dir>0<dst dir>1 . . . <dst dir>n generated by specifying the /TARGETS command line option), all the distributions will be different.

The date<n>=<date> line specifies special date constants that can be used to compare the results of time source functions in expressions generated with the pre-processor. The date format is MM/DD/YYYY.

As discussed above, on the first pass the CPPP parses the source code grammar so that it can be readily read, and on the second pass, it modifies these files according to the pragma directives in the source code. Once the grammar of the source code is completely parsed in the first pass, the CPPP "executes" each pragma directive individually.

The fingerprinting directives cause the CPPP to randomly alter and permute data and control structures in the source code in a way that does not affect the code's original logic, but resulting in binary builds that are distinguishable. For example, the permutation directive (fingerprint_begin_permute/fingerprint_end_permute) randomly reorders global variables definitions and object declarations and methods.

To implement this directive, the CPPP enumerates all the lines of code between the begin and end permute directives. Then the CPPP chooses a pair of numbers (between 1 and the number of lines within the clauses) and permutes the underlying lines. This last transformation is applied several times. Once finished, the lines of code between the begin and end permute directives will have been randomly reordered. This is based on a principle of combinatoric mathematics, which states that all possible reorderings can be obtained by reordering pairs. When <permutation id> is used, the CPPP remembers the particular permutation used for that operation and applies the same permutation to subsequent permute clauses with the same id, but this can only be used when permuting lists with the same number of elements.

The fingerprint_if clause is applied to if/then/else statements to randomly interchange the then/else body of the statement and negate the condition as necessary to maintain the code logic. Whenever a fingerprint_if directive is found, the CPPP reads the next bit in the random pool and decides whether the <then_clause> and <else_clause> will be interchanged. For example, if negated, the expression: if(a<22) [print "yes"] else [print "no"]; is replaced by: if(!a<22)[print "no"] else [print "yes"].

The fingerprint_constant directive can be used before the declaration of a constant. On the second pass, the CPPP replaces the declaration of the constant that follows the directive in the source code by the declaration of an expression evaluating to this same constant. As an example, a line of source code where the number 2 is used as a constant could be changed by replacing this constant by the expression: 4−(3*2)+5−2+1, which evaluates to 2. The expression size is variable, with a default size of 50. The generation of this expressions is done by a simple algorithm.

Developers may provide additional time functions that return the current time from different sources. These functions must conform to the time() prototype (i.e. returning time_t: seconds elapsed since Jan. 1, 1970). These functions could be called from fingerprint_constant constraints. Providing additional time functions will make the task of an attacker more difficult, because the attacker will have to find and hook all time functions calls in order to tamper with expiration date checks. When this is combined with the encryption scheme, the task of finding all the time functions calls becomes even more difficult.

The encryption directives, as described above, are used to define the ranges of encrypted blocks. The software protection framework enciphers the code between the "encrypt" and "end_encrypt" directives using a symmetric cipher, e.g, the advanced encryption standard (AES), and a random key. The framework also implements the necessary key management necessary to retrieve the random key and decrypt the block of code when the natural execution of the program requires it.

Cryptographic triggers may be used to augment the encryption directives. For example, the trigger_strcmp clause, discussed above, may be used to implement a string comparison and to obtain decryption keys for the encrypted blocks. The CPPP replaces the trigger_strcmp expression and inserts the decryption instructions as needed. More generally, cryptographic triggers are cryptographic primitives devised for hiding (by enciphering) pieces of code until they are required for use. The security requirement imposed over this primitive is that only a "correct" execution will unhide this enciphered piece of code, while unauthorized executions will not be able to decipher this code. These triggers implement a challenge-and-response mechanism in which the response may be implicitly derived from parameters relating to the license policy or the natural execution flow of the program. Only when the challenge is successful can the trigger algorithm construct the key that is used for deciphering the block of code in question. This is shown, for example, in FIG. 6 in which a trigger process 180 receives an input and constructs and outputs a proposed key. This output is received by a comparator 181, which performs a hash operation on the proposed key and compares it to the stored hash value for the actual key. If they fail to agree, nothing is done. If they do agree, a further process 182 will use this key to decipher the enciphered block of code and execute it.

The CPPP performs a number of tasks to implement the encryption directives. When the /ENCRYPTION flag is present in the CPPP command line or the "encryption=yes" line is present in the configuration file (softprot.ini), the CPPP arranges for the post-processor to be included in the target project (i.e., the fully compiled and operational program code). CPPP also configures the project to link the post-processor library to the target project and to generate line number information in a map file. Then, the CPPP adds calls to the decryption function whenever a trigger is used and creates a file (encrypt.dat) in the target directory that contains references to the blocks to which each trigger is associated (by specifying the starting line and ending line of each block within the corresponding source code file). In addition, the CPPP modifies the ".dsp" file, which specifies the parameters of the project, so that the pre-processed source code (i.e., the output of the CPPP) in the destination directory is compiled in the compiling stage.

In the second stage of the software protection process, the source code is compiled into a binary build. In this example, the fingerprinted source code 124 is processed by a standard Microsoft Visual C compiler 126 using an additional proprietary library 125 that handles the encryption and decryption functions that are later used during the protection stage 128. Of course, any compiler may be used, and indeed, the techniques described herein are not limited to the C programming language. To the contrary, any programming language that can accommodate the addition of the fingerprinting and encryption directives may be used.

In the third stage of the software protection process, the protector 128 completes the implementation of the cryptographic triggers that are used to enhance the robustness of fingerprinting and license enforcement by preventing attackers from erasing or tampering with these features. The protector 128 also appends additional information the binaries to ensure correct execution 129, as further described below. The "protector.exe" post-processor resides in the same directory as the CPPP pre-processor. Also, the file "triggerlib.lib", which contains the encryption library, is also available in the same directory. The post-processor modifies the binary files compiled with msdev (the C compiler) from pre-processed source code, encrypting specified blocks as needed and completing parameters used by the triggers.

The protector makes a first pass over the binary files (the compiled pre-processed source code) to detect and store all cryptographic trigger occurrences. It also generates and stores the keys used for encryption and decryption of the blocks. The protector calculates message digest checks of every block to be encrypted (using SHA1 hash function by default). All of this information, along with the starting and ending lines (in the output of the CPPP) of each block to be encrypted and the position of these blocks in the binaries (which is obtained from the map file created by the compiler), are stored on a global list that is included in the build.

On a second pass, the protector encrypts the blocks marked for encryption, but does so in a way that they can be decrypted during execution of the program. When a function inside an encrypted block is required, the program constructs a key for decryption, checks that the key is the necessary key for the decryption of this block, decrypts the block, and checks that the block has been correctly decrypted. Both checks are implemented using a hash function (e.g., SHA160) to compare the hash values against those values stored by the protector in the global list, as described above.

As discussed above, the use of fingerprinting in the software protection process allows unique builds to be generated and distributed to customers. This, in turn, allows the developer to trace any unauthorized copies of the software back to their source by performing a "traitor-tracing" or build-recognizing operation. Given a full binary file or a small binary fragment, the recognizer identifies the embedded fingerprint and lookup the build associated with it, thereby identifying the user associated with that particular build.

The recognizer proceeds by analyzing a series of binary builds looking for unique strings that allow identification. Given a positive integer n, e.g., n=25, the recognizer checks 25-byte sub-strings from the build under inspection and classifies them as strings belonging to: every build, a group of builds, or a single build. Then, this information is used to perform the identification of the binary fragments. The recognizer may be implemented in a highly efficient manner using a dictionary data structure. For example, a "hash table" that uses sub-strings as keys with the build number as the associated value may be used.

To initialize the hash table, every 25-byte sub-string from every distributed binary is inserted in the dictionary. This requires a computation time that varies linearly with the size of the binary files processed. Typical binary files are smaller than 100 megabytes, in which case the operation is completed in a few seconds in a standard personal computer (PC). Then, a build to be analyzed is divided into sub-strings and each sub-string is looked up in the table. For each sub-string, the table will return at least one and possibly several builds in which that sub-string may be found. These look-up results then are analyzed statistically to determine the likely source of the build being analyzed.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims.

What is claimed is:

1. A method for protecting software, source code for the software having a first directive marking an encryption beginning point and a second directive marking an encryption end point, the method comprising the steps of:
   processing the source code to identify a block of code between the first and second directives;
   compiling the source code to produce a binary file;
   generating a random string and establishing a mechanism that allows the software to obtain a valid key from a data flow expected to be received by the software in a manner that the valid key is neither stored within the software, nor located in a remote storage, but instead is obtained from the data flow,
   wherein the step of establishing the mechanism further comprises the steps of:
      encrypting the random string with the valid key to obtain a first encrypted value;
      encrypting a portion of the binary file corresponding to the block of code with the valid key to obtain a second encrypted value; and
      replacing the portion of the binary file corresponding to the block of code with the second encrypted value and code that can decrypt the second encrypted value during execution of the software,
   accepting a binary string believed to be the valid key;
   encrypting the random string with the binary string believed to be the valid key to obtain a third encrypted value;
   comparing the third encrypted value to the first encrypted value; and
   decrypting the second encrypted value with the binary string believed to be the valid key if the first encrypted value equals the third encrypted value.

2. The method of claim 1, further comprising the step of storing line number information for the block, wherein the step of encrypting the portion of the binary file is based on the stored line number information.

3. The method of claim 1, further comprising the step of decrypting the encrypted portion of the binary file during execution of the binary file based on the valid key obtained during execution of the binary file.

4. The method of claim 3, further comprising the steps of:
   accepting a trigger value;
   generating a hash of the trigger value;
   comparing the hash of the trigger value to a hash of the valid key; and
   outputting the valid key if the hash of the trigger value equals the hash of the valid key.

5. The method of claim 3, further comprising the steps of:
   accepting a sequence of trigger values;
   encrypting the random string using the sequence of trigger values as keys to obtain a first sequence of encrypted values;
   comparing the first sequence of encrypted values to a second sequence of encrypted values obtained by encrypting the random string with a sequence of secret sub-keys; and
   outputting a secret key if each member of the first sequence of encrypted values equals each respective member of the second sequence of encrypted values,
   wherein the secret key is equal to an exclusive OR of the sequence of secret sub-keys.

* * * * *